United States Patent
Birkenheuer et al.

(10) Patent No.: US 12,043,758 B2
(45) Date of Patent: Jul. 23, 2024

(54) METHOD FOR TREATING METALLIC SURFACES WITH AN ACIDIC AQUEOUS COMPOSITION TO IMPROVE CORROSION RESISTANCE

(71) Applicants: Chemetall GmbH, Frankfurt (DE); RHODIA OPERATIONS, Aubervilliers (FR)

(72) Inventors: Stefan Birkenheuer, Shanghai (CN); Carina Hecker, Frankfurt am Main (DE); Oliver Sauer, Frankfurt am Main (DE); Daniel Schatz, Frankfurt am Main (DE); Nawel Souad Khelfallah, Frankfurt am Main (DE); Marie-Pierre Labeau, Sèvres (FR); Guillaume Gody, Rueil-Malmaison (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 749 days.

(21) Appl. No.: 17/257,240

(22) PCT Filed: Jul. 3, 2019

(86) PCT No.: PCT/EP2019/067873
§ 371 (c)(1),
(2) Date: Dec. 30, 2020

(87) PCT Pub. No.: WO2020/007925
PCT Pub. Date: Jan. 9, 2020

(65) Prior Publication Data
US 2021/0269654 A1  Sep. 2, 2021

(30) Foreign Application Priority Data
Jul. 5, 2018 (EP) .................................. 18182046

(51) Int. Cl.
| | | |
|---|---|---|
| C09D 5/08 | (2006.01) | |
| C09D 133/26 | (2006.01) | |
| C09D 183/08 | (2006.01) | |
| C23C 2/26 | (2006.01) | |
| C23C 22/34 | (2006.01) | |
| C23F 11/173 | (2006.01) | |

(52) U.S. Cl.
CPC ........... *C09D 5/084* (2013.01); *C09D 133/26* (2013.01); *C09D 183/08* (2013.01); *C23C 2/26* (2013.01); *C23C 22/34* (2013.01); *C23F 11/173* (2013.01); *C23C 2222/20* (2013.01)

(58) Field of Classification Search
CPC ................................ C09D 5/084; C23C 22/34
See application file for complete search history.

(56) References Cited

U.S. PATENT DOCUMENTS

| | | | |
|---|---|---|---|
| 2007/0240792 A1 | 10/2007 | Witteler et al. | |
| 2012/0070674 A1* | 3/2012 | Sebralla | C23C 22/34 |
| | | | 428/447 |
| 2012/0177826 A1* | 7/2012 | Kolberg | C23C 22/364 |
| | | | 427/337 |
| 2020/0181778 A1* | 6/2020 | Sebralla | C09D 7/62 |

FOREIGN PATENT DOCUMENTS

| | | |
|---|---|---|
| FR | 2794464 A1 | 12/2000 |
| JP | 2006213958 A | 8/2006 |
| WO | 9630421 A1 | 10/1996 |
| WO | 9801478 A1 | 1/1998 |
| WO | 9858974 A1 | 12/1998 |
| WO | 9931144 A1 | 6/1999 |
| WO | 9935177 A1 | 7/1999 |
| WO | 9935178 A1 | 7/1999 |
| WO | 0075207 A1 | 12/2000 |
| WO | 0142312 A1 | 6/2001 |
| WO | 0226836 A2 | 4/2002 |
| WO | 2016096777 A1 | 6/2016 |
| WO | 2017220632 A1 | 12/2017 |

OTHER PUBLICATIONS

International Search Report and Written Opinion for corresponding PCT/EP2019/067873 mailed Sep. 20, 2019, 10 pages.

* cited by examiner

*Primary Examiner* — Robert A Vetere
(74) *Attorney, Agent, or Firm* — Osha Bergman Watanabe & Burton LLP

(57) ABSTRACT

Described herein is a method for treatment of a metallic surface, including the step of contacting the metallic surface with an acidic aqueous composition. Also described herein is an acidic aqueous composition used in the method for treatment, a master batch to produce such acidic aqueous composition, a method of using the acidic aqueous composition to treat metallic surfaces and substrates including the thus treated metallic surfaces.

16 Claims, No Drawings

METHOD FOR TREATING METALLIC SURFACES WITH AN ACIDIC AQUEOUS COMPOSITION TO IMPROVE CORROSION RESISTANCE

CROSS-REFERENCE TO RELATED APPLICATIONS

This application is a U.S. National Phase Application of International Patent Application No. PCT/EP2019/067873, filed Jul. 3, 2019, which claims the benefit of priority to European Patent Application No. 18182046.5, filed Jul. 5, 2018, the entire contents of which are hereby incorporated by reference herein.

The present invention relates to a method for treating metallic surfaces with an acidic aqueous composition. The invention further relates to an acidic aqueous composition used in the method for treatment, a master batch to produce such acidic aqueous composition, the use of the acidic aqueous composition to treat metallic surfaces and substrates comprising the thus treated metallic surfaces.

The treatment of metallic surfaces with aqueous compositions, containing organoalkoxysilanes and their hydrolysis products and/or condensation products in the presence of further components is known. The coatings formed from these compositions provide a certain corrosion protection and adhesion to subsequent coating layers. It is also known, that some of these compositions contain polymers which are stable in an acidic environment and which can further improve some of the properties of the resultant layers.

However, particularly such metallic surfaces containing steel such as cold rolled steel or hot rolled steel, or which are hot dip galvanized steel or galvanized steel surfaces still suffer from corrosive sub-surface migration.

Prior art pretreatment compositions often show a destabilization of the polymer particles used therein. During treatment processes, the compositions are often filtered and such precipitated polymer particles are removed and/or clog the filters used for filtration. The depletion of the bath because of removed polymer precipitate makes it necessary to supplement such bath with much more polymer as would be necessary, if the polymer is dissolved in homogenous solution. Therefore, there is still a need to provide treatment compositions wherein the polymer does not tend to precipitate and stays in a solubilized form.

It was the aim of the present invention to overcome the drawbacks of prior art metallic surface pretreatment compositions, in particular to provide a method for treatment of a metallic surface where the treatment bath is homogenous and essentially free from precipitated polymer particles and the treated metallic surface shows an enhanced corrosion resistance even under severe test conditions as e.g. the accelerated corrosion test according to VDA 621-415 (10 cycles) or the MEKO S test. Particularly less sub-surface migration should be observed.

Some polymers used in prior art are well dissolved in the bath, but have a detrimental effect on stone chip resistance. Therefore a further problem to be solved by the present invention was to provide a method for treatment which has no or only negligible effects on the stone chip resistance.

The aims of the present invention were achieved by providing a method for treatment of a metallic surface, comprising the step of contacting the metallic surface with an acidic aqueous composition, the acidic aqueous composition comprising (a) one or more metal compounds (M) selected from the group of titanium compounds, zirconium compounds and hafnium compounds;

(b) one or more linear polymers (P), prepared by controlled radical polymerization, containing (m1) N, N-dimethyl (meth)acryl amide, and (m2) vinylphosphonic acid, in form of their polymerized monomeric units, with the proviso that 85 to 95 mol-% of the polymerized monomeric units are polymerized monomeric units of N, N-dimethyl (meth)acryl amide, and the rest of the polymerized monomeric units are polymerized monomeric units of vinylphosphonic acid, and the one or more linear polymers (P) are being comprised in the acidic aqueous composition in an amount of 10 to 500 ppm based on the total weight of the acidic aqueous composition; and (c) one or more hydrolysable organosilane compounds (S) or their hydrolysis products (HS) and/or condensation products (CS).

The term "metallic" as used therein encompasses metals and alloys as e.g. zinc, steel etc.

The term "metallic surface" encompasses surfaces of metals and alloys as well as metallic or alloy surfaces deposited on non-metallic substrates. A metallic surface can also consist of different regions comprising different metals or alloys.

An "aqueous composition" is a composition containing at least 50 wt.-%, preferably at least 60 wt.-%, more preferably at least 70 wt.-% and most preferably at least 80 or even 90 wt.-% of water based on the total content of organic and inorganic solvents including water.

The term "acidic" means that the composition has pH value of less than 7 at room temperature (23° C.).

The term "(meth)acryl" is the generic term for both "acryl" and "methacryl". For example, the term "(meth)acrylic acid" stands for acrylic acid, methacrylic acid and the mixture of both.

The term "polymerized monomeric unit" means the unit generated by polymerization of the respective monomer. For example, the polymerized monomeric unit of vinylphosphonic acid ($H_2C=CH-P(=O)(OH)_2$) is $H_2C^*-C^*H-P(=O)(OH)_2$, wherein the asterisks denote the carbon atoms bound to the adjacent polymerized monomeric units.

A "hydrolysable organosilane compound" is an organosilicon compound having at least one Si—C bond and at least one hydrolysable group, such as a $Si-O(C=O)_nR^a$ group, wherein $R^a$ is an alkyl group preferably having 1 to 4 carbon atoms and n=0 or 1.

The "hydrolysis product" of the "hydrolysable organosilane compound" is an organo-silicon compound having at least one Si—C bond and at least one Si—OH group. The Si—OH group preferably being formed by hydrolysis of the above hydrolysable group, such as the $Si-O(C=O)_nR^a$ group under formation of the Si—OH group and $HO(C=O)_nR^a$, respectively.

The "condensation product" of the "hydrolysable organosilane compound" is an organo-silicon compound having at least one, preferably two or more Si—C bond(s) and at least one Si—O—Si group. The Si—O—Si group preferably being formed by condensation reaction of a $Si-O(C=O)_nR^a$ group with a Si—OH group under formation of the Si—O—Si group and $HO(C=O)_nR^a$ or by condensation reaction of two Si—OH groups under formation of the Si—O—Si group and water.

The acidic aqueous composition as used in the above method for treatment may comprise further components and/or ions as lined out in the detailed description. The term "further comprises", as used herein throughout the description in view of the ingredients of acidic aqueous compositions, means "in addition to the mandatory (a) metal compounds (M), (b) polymers (P) and (c) hydrolysable silane compounds (S) and their hydrolysis products (HS) and condensation products (CS)". Therefore, such "further" compounds and/or ions differ from the mandatory ingredients.

DETAILED DESCRIPTION

Metallic Surface

Preferably the metallic surface contains or consists of one or more of the following metals or alloys: zinc, steel, cold rolled steel, hot rolled steel, galvanized steel (zinc plated steel), and particularly preferred hot-dip galvanized steel (hot zinc dipped steel) and steel such as cold rolled steel. However, the method for treatment can also be carried with aluminum, magnesium and/or zinc-magnesium alloys as metallic surfaces. The metallic surface can also be a metallic surface of a composite material having two or more kinds of metallic surfaces. Such surfaces can be treated at the same time by any of the treatment methods as described herein below. Therefore, the method for treatment according to the present invention is also capable for multi-metal treatment.

Acidic Aqueous Composition

The acidic aqueous composition is preferably used as a dip coat bath. However it can also be applied to the metallic surfaces by virtually any conventional coating procedure like e.g. spray coating, roll coating, brushing, wiping etc.

The pH value of the acidic aqueous composition is preferably in the range of 0.5 to 5.5, more preferred 2 to 5.5, particularly preferred 3.5 to 5.3 and most preferred 4 to 5. The pH is preferably adjusted by using nitric acid, aqueous ammonia and/or sodium carbonate.

Metal compounds (M)

The metal compounds (M) selected from titanium, zirconium and hafnium compounds are preferably added in an amount to achieve a metal concentration of titanium, zirconium, hafnium or a mixture of these metals in the range from 20 to 1600 ppm, more preferably in the range from 40 to 700 ppm, even more preferably in the range from 60 to 250 ppm and most preferably in the range from 80 to 160 ppm, as e.g. 90 to 110 ppm based on Ti, Zr, Hf or their combinations.

Particularly preferred titanium, zirconium and hafnium compounds are the fluoro metallates of these metals. The term "fluoro metallate" includes the single and multiple protonated forms as well as the deprotonated forms. Particularly preferred are fluoro zirconates. It is also possible to use mixtures of such fluoro metallates.

Moreover, zirconium can also be added in form of zirconyl compounds as e.g. zirconyl nitrate and zirconyl acetate; or zirconium carbonate or zirconium nitrate, the latter one being particularly preferred. The same applies to titanium and hafnium.

Polymer (P)

Polymer (P) comprises polymerized monomeric units formed from (m1) N,N-dimethyl (meth)acryl amide and (m2) vinylphosphonic acid, with the proviso that 85 to 95 mol-% of all monomeric units are polymerized units of N,N-dimethyl (meth)acryl amide and the rest of the polymerized monomeric units are polymerized units of vinylphosphonic acid.

Polymer (P) preferably has a number average molecular weight Mn from 10,000 to 30,000 g/mol and a weight average molecular weight Mw from 20,000 to 60,000 g/mol.

Polymer (P) is contained in the acidic aqueous composition, which is used in the method of treatment according to the present invention, in a concentration of 10 to 500 ppm. Preferably the concentration is in the range of 20 to 250 ppm, more preferably in the range of 25 to 150 ppm and most preferably in the range of 30 to 100 ppm or even more preferred in the range of 40 to 60 ppm.

Polymers (P) are linear polymers. The monomeric units can be arranged statistically, in two or more blocks or as a gradient along the polymeric backbone of polymer (P). However, such arrangements can also be combined.

The polymers (P) are specifically prepared by a controlled radical polymerization of monomers (m1) and (m2), said polymerization being carried out continuously or batchwise. According to a specific embodiment the one or more polymers (P) used in the method of treatment according to the present invention are random copolymers obtained by a controlled radical copolymerization of monomers (m1) and (m2), namely copolymers obtained by contacting monomers (m1) and (m2), a free radical source and a radical polymerization control agent.

Herein, the term "radical polymerization control agent" (or more concisely "control agent") refers to a compound which can extend the lifetime of the growing polymer chains in a radical polymerization reaction and of conferring, on the polymerization, a living or controlled nature. This control agent is typically a reversible transfer agent as used in controlled radical polymerization denoted by the terminology RAFT or MADIX, which typically use a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2794464 or WO 02/26836.

According to an advantageous embodiment, the radical polymerization control agent used for preparing polymer (P) is a compound which comprises a thiocarbonylthio group —S(C=S)—. Thus, for example, it may be a compound which comprises at least one xanthate group (bearing —SC=S—O— functions), for example one or two xanthates. According to one embodiment, the compound comprises several xanthates. Other types of control agent may be envisaged (for example of the type used in ATRP (Atom Transfer Radical Polymerization)).

Typically, the control agent is a non-polymeric compound bearing a group that ensures control of the radical polymerization, especially a thiocarbonylthio group —S(C=S)—. According to a more specific variant, the radical polymerization control agent is a polymer, advantageously an oligomer and bearing a thiocarbonylthio —S(C=S)— group, for example a xanthate —SC=S—O— group, typically obtained by a radical polymerization monomers in the presence of a control agent bearing a thiocarbonylthio —S(C=S)— group, for example a xanthate.

A suitable control agent may, for example, have formula (A) below:

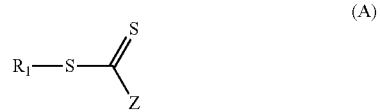

wherein:

Z represents hydrogen, chlorine, a cyano group, a dialkyl- or diarylphosphonato radical, dialkyl-phosphinato or diaryl-phosphinato radical or any of the following optionally substituted radicals: an alkyl radical, an aryl radical, a heterocyclic radical, an alkyl thio radical, an aryl thio radical, an alkoxy radical, an aryloxy radical, an amino radical, a hydrazine radical, an alkoxycarbonyl radical, an aryloxycarbonyl radical, an acyloxy or carboxyl radical, an aroyloxy radical, a carbamoyl radical, polymeric chain radical; and $R_1$ represents any of the following optionally substituted radicals: an alkyl radical, an acyl radical, an aryl radical, an aralkyl radical, an alkenyl radical or alkynyl radical; or a saturated or unsaturated or aromatic, optionally substituted carbocycle or heterocycle; or a polymer chain radical, which is preferably hydrophilic or water-dispersible.

The groups $R_1$ or Z, when they are substituted, may be substituted with optionally substituted phenyl groups, optionally substituted aromatic groups, saturated or unsaturated carbocycles, saturated or unsaturated heterocycles, or groups chosen from the following: alkoxycarbonyl or aryloxycarbonyl (—COOR), carboxyl (—COOH), acyloxy (—$O_2$CR), carbamoyl (—$CONR_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—$NR_2$), halogen, perfluoroalkyl $C_nF_{2n+1}$, allyl, epoxy, alkoxy (—OR), S-alkyl, S-aryl, groups of hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

The group $R_1$ may alternatively be amphiphilic, i.e. it may have both hydrophilic and lipophilic nature. It is preferable for $R_1$ not to be hydrophobic.

$R_1$ may typically be a substituted or unsubstituted, preferably substituted, alkyl group. A control agent of formula (A) may nevertheless comprise other types of groups $R_1$, in particular a ring or a polymer chain radical.

The optionally substituted alkyl, acyl, aryl, aralkyl or alkyne groups generally bear from 1 to 20 carbon atoms, preferably from 1 to 12 and more preferentially from 1 to 9 carbon atoms. They may be linear or branched. They may also be substituted with oxygen atoms, in particular in the form of esters, sulfur atoms or nitrogen atoms. Among the alkyl radicals, mention may be made especially of the methyl, ethyl, propyl, butyl, pentyl, isopropyl, tert-butyl, pentyl, hexyl, octyl, decyl or dodecyl radical. The alkyne groups are radicals preferably comprising 2 to 10 carbon atoms; they bear at least one acetylenic unsaturation, such as the acetylenyl radical.

The acyl group is a radical preferably bearing from 1 to 20 carbon atoms with a carbonyl group.

Among the aryl radicals, mention may be made especially of the phenyl radical, which is optionally substituted, in particular with a nitro or hydroxyl function.

Among the aralkyl radicals, mention may be made especially of the benzyl or phenethyl radical, which is optionally substituted, in particular with a nitro or hydroxyl function.

When $R_1$ or Z is a polymer chain radical, this polymer chain may result from a radical or ionic polymerization or from a polycondensation.

Advantageously, the control agent is selected from compounds bearing a xanthate —S(C=S)O—, trithiocarbonate, dithiocarbamate or dithiocarbazate function, for example compounds bearing an O-ethyl xanthate function of formula —S(C=S)OCH$_2$CH$_3$.

Xanthates prove to be very particularly advantageous, in particular those bearing an O-ethyl xanthate —S(C=S)OCH$_2$CH$_3$ function, such as O-ethyl S-(1-(methoxycarbonyl)ethyl) xanthate (CH$_3$CH(CO$_2$CH$_3$))S(C=S)OEt.

Unlike other state of the art polymers, the polymers (P) used in the method of the present invention do not only reduce the corrosive sub-surface migration, they also do not tend to precipitate in the acidic aqueous compositions.

Without wanting to be bound by theory it is believed that the metal compounds (M) are apt to etch the metallic surfaces in the acidic environment, resulting in the formation of a pH gradient with increasing pH value near the metallic surface causing a partial dissociation of the protons from the phosphonic acid groups present in monomeric unit (m2) of polymer (P). This in turn causing the attachment of the partially deprotonated phosphonic acid groups to the metallic surface under formation of a barrier layer which prevents and/or reduces the migration or diffusion of corrosive salts to the metallic surface.

The properties of the formed coatings are thus being improved, particularly the corrosive subsurface migration, particularly on steel and hot-dip galvanized steel surfaces and substrates, is significantly reduced.

The linear polymer (P) consists of 85 to 95 mol-% of polymerized monomeric units, formed from (m1), i.e. N,N-dimethyl (meth)acryl amide and 5 to 15 mol-% of polymerized monomeric units, formed from (m2), i.e. vinylphosphonic acid, based on the total amount of polymerized monomeric units.

A particularly preferred polymer (P) is obtained by a controlled radical polymerization of a monomer mixture consisting of 87 to 93 mol-% of N,N-dimethyl (meth)acryl amide and 7 to 17 mol-% of vinylphosphonic acid, most preferably a monomer mixture consisting of 90 mol-% of N,N-dimethyl (meth)acryl amide and 10 mol-% of vinylphosphonic acid; the particularly preferred polymer (P) having a number average molecular weight Mn from 12,000 to 20,000 g/mol, more preferred from 13,000 to 16,000 g/mol; and a weight average molecular weight from 22,000 to 30,000 g/mol, more preferred from 24,000 to 28,000 g/mol. Most preferably polymer (P) is obtained by a controlled radical polymerization of a monomer mixture consisting of 90 mol-% of N,N-dimethyl (meth)acryl amide and 10 mol-% of vinylphosphonic acid and having a number average molecular weight Mn being 14,400 g/mol and the weight average molecular weight Mw being 26,000 g/mol.

Such a polymer may for example be prepared by a controlled radical polymerization using O-ethyl S-(1-(methoxycarbonyl)ethyl) xanthate as a control agent (see above), according to the process described for example in WO 98/58974.

The number average and weight average molecular weights, Mn and Mw, respectively, as referred to in the instant description, may be measured according to the following protocol: Samples are analyzed by SEC equipped with a MALS detector. Absolute molar masses are obtained with a dn/dC value chosen equal to 0.1875 mL/g, to get a recovery mass around 90%. Polymer samples are dissolved in the mobile phase and the resulting solutions are filtrated with a Millipore filter 0.45 μm. Eluting conditions are the following ones. Mobile phase: H$_2$O 100% vol. 0.1 M NaCl, 25 mM NaH$_2$PO$_4$, 25 mM Na$_2$HPO$_4$; 100 ppm NaN$_3$; flow rate: 1 mL/min; columns: Varian Aquagel OH mixed H, 8 μm, 3*30 cm; detection: RI (concentration detector Agilent)+MALLS (MultiAngle Laser Light Scattering) Mini Dawn Tristar+UV at 290 nm; samples concentration: around 0.5 wt % in the mobile phase; injection loop: 100 μL.

Hydrolysable Organosilane Compounds (S), their Hydrolysis Products (HS) and Condensation Products (CS)

The hydrolysable organosilane compound (S) is preferably selected from the group consisting of organoalkoxysilanes. Non-condensed and condensed hydrolysis products (HS) thereof are for example organosilanoles and polyorganosilanoles, while condensation products (CS) of the organosilane compound (S) can be subsumed under the generic classes of organosiloxanes and/or polyorganosiloxanes.

The hydrolysable organosilane compounds (S), their hydrolysis products (HS) and condensation products (CS) are contained in the acidic aqueous composition which is used in the method for treatment according to the present invention in a concentration of preferably 1 to 750 ppm, calculated as silicon (Si). More preferably the concentration is in the range of 5 to 500 ppm, even more preferably of 10 to 250 ppm and most preferably of 15 to 45 ppm, calculated as silicon.

Preferably, the hydrolysable silane compounds (S) comprise at least one, more preferably one or two of the following groups: amino groups, urea groups, imido groups, imino groups and/or ureidos group, particularly preferred are amino groups. The same applies for the hydrolysis products (HS) thereof. The condensation products (CS) of such hydrolysable silane compounds (S) will contain the same number of the before mentioned groups per condensed unit of the hydrolysable silane comprised in the condensation products (CS).

More preferably, said component c) consists of one or more organoalkoxysilanes, organosilanoles, polyorganosilanoles, organosiloxanes and/or polyorganosiloxanes each having at least one, particularly one to two amino groups per condensed unit of the hydrolysable silane compound (S) comprised in the condensation products (CS). Particularly preferred hydrolysable silane compounds (S) are 2-amino-ethyl-3-amino-propyltrimethoxysilane, 2-aminoethyl-3-amino-propyltriethoxysilane, bis(tri-methoxysilylpropyl) amine or bis(triethoxysilyl-propyl)amine or a combination of these.

Most preferred as hydrolysable silane compounds (S) are N-(2-aminoethyl)-3-aminopropyltrimethoxysilane and bis [3-(trimethyoxysilyl)propyl]amine and their combinations. The hydrolysis products (HS) and condensation products (CS) thereof can be formed in situ in the acidic aqueous composition or in advance in an aqueous medium, which may subsequently being added to become part of the acidic aqueous composition.

Further Components and/or Ions that May be Contained in the Acidic Aqueous Composition Metal Cations Preferably the acidic aqueous compositions further comprise at least one kind of metal cation selected from the group of cations of metals of the $1^{st}$ to $3^{rd}$ subgroup (copper, zinc and scandium groups) and $5^{th}$ to $8^{th}$ subgroup (vanadium, chromium, manganese, iron, cobalt and nickel groups) of the periodic table of the elements including the lanthanides as well as the $2^{nd}$ main group of the periodic table of the elements (alkaline earth metal group), lithium, bismuth and tin. The before-mentioned metal cations are generally introduced in form of their water-soluble compounds, preferably as their water-soluble salts.

More preferably the further metal cation(s) is/are selected from the group consisting of cations of cerium and the other lanthanides, chromium, iron, calcium, cobalt, copper, magnesium, manganese, molybdenum, nickel, niobium, tantalum, yttrium, vanadium, lithium, bismuth, zinc and tin.

Most preferred as further metal cations are zinc, copper, cerium and/or molybdenum cations. Amongst these, zinc cations and copper cations, particularly copper cations, are given preference.

Generally, the total concentration of the further metal cations under this headline is in the range of 5 to 5000 ppm. The most preferred range for zinc cations is 100 to 5000 ppm, for each of copper and cerium cations 5 to 50 ppm and for molybdenum 10 to 100 ppm.

pH-Value Adjusting Substances

Preferably the acidic aqueous composition used in the method for treatment of a metallic surface according to the invention includes one or more substances selected from the group consisting of nitric acid, sulfuric acid, methanesulfonic acid, acetic acid, aqueous ammonia, sodium hydroxide and sodium carbonate, wherein nitric acid, aqueous ammonia and sodium carbonate are preferred. Depending on the pH value of the acidic aqueous composition, the above compounds can be in their fully or partially deprotonated form or in protonated forms.

Organic Solvents

While the addition of solvents is neither necessary nor specially desired, the acidic aqueous composition used in the method for treatment of a metallic surface according to the invention, may contain some organic solvents, particularly ethanol and/or methanol. By using the preferred organoalkoxysilanes, as described above, as hydrolysable organosilane compound (S), ethanol and methanol, respectively, are formed in situ due to hydrolysis and/or condensation of the hydrolysable organosilane compound (S) in the acidic aqueous environment.

Water-soluble Fluorine Compounds

The acidic aqueous composition used in the method for treatment of a metallic surface according to the invention, preferably further contains water-soluble fluorine compounds such as fluorides or hydrofluoric acid.

The amount of free fluoride ($F^-$) in the acidic aqueous composition used in the method for treatment of a metallic surface according to the invention is preferably in the range of 15 to 150 ppm, more preferably 25 to 100 ppm and most preferred 30 to 50 ppm.

Further Ions

The acidic aqueous composition used in the method for treatment of a metallic surface according to the invention, can contain further ions, as for example sodium and/or ammonium ions, phosphates and/or phosphonates, and nitrates, each of them from sources other than the aforementioned sources. For example, nitrates may origin from the afore-mentioned nitric acid used for pH adjustment, but also from salts of nitric acid. However, sulfur containing compounds, particularly sulfates should be avoided. Therefore, it is preferred that the amount of sulfur containing compounds in the acidic aqueous composition is below 100 ppm (calculated as sulfur).

If ppm amounts or ranges are mentioned above or below with respect to any ions or any ingredients, it is irrespective from which source the ions origin.

Treatment Procedure

The metallic surfaces to be treated may be cleaned and/or edged before treatment with the acidic aqueous composition. The treatment procedure can for example be a spray coating or dip coating procedure. The composition can also be applied by flooding the metallic surface or by roll coating or even manually by wiping or brushing. Furthermore, it is possible to use an electrodeposition method for the treatment of the metallic surface.

The treatment time, i.e. the period of time the metallic surface is contacted with the acidic aqueous composition used in the method for treatment of a metallic surface according to the invention, is preferably from 15 seconds to 20 minutes, more preferably from 30 seconds to 10 minutes, and most preferably 45 seconds to 5 minutes, as for example 1 to 3 minutes. If the metallic surface is the surface of a coil and the treatment procedure is a coil-coating procedure, the treatment time can be even lower than 15 seconds, for examples as low as 1, 2 or 3 seconds while the upper limit or treatment time in this procedure may also be 15 minutes or 20 minutes.

The temperature of the acidic aqueous composition used in the method for treatment of a metallic surface according to the invention is preferably from 5 to 50° C., more preferably from 15 to 40° C. and most preferably from 25 to 35° C.

Further Subjects of the Invention

A further subject of the invention is the acidic aqueous composition itself, which is described above for the use in the method for treatment of a metallic surface according to the invention, and also a master batch to produce such acidic aqueous composition is a subject of the present invention. If a master batch is used to produce the acidic aqueous composition according to the present invention, the master batch typically contains the ingredients of the acidic aqueous composition to be produced in the desired proportions, but at a higher concentration. Such master batch is preferably diluted with water to the concentrations of ingredients as disclosed above to form the acidic aqueous composition. If necessary, the pH value of the acidic aqueous composition may be adjusted after dilution of the master batch.

Of course, it is also possible to further add ingredients to the water wherein the master batch is diluted or to add ingredients after diluting the master batch with water. It is however preferred that the master batch already contains all necessary ingredients.

Preferably the master batch is diluted with water and/or an aqueous solution in the ratio of 1:5,000 to 1:10, more preferred 1:1,000 to 1:10, most preferred in the ratio of 1:300 to 1:10 and even more preferred 1:150 to 1:50.

Another subject of the present invention is the use of the acidic aqueous composition for treating a metallic surface. Particularly preferred is the use of the acidic aqueous composition for treating a metallic surface to provide corrosion protection to the metallic surface and/or to provide an excellent adhesion of further coatings applied onto the thus treated metallic surface. The metals and/or alloys of the metallic surfaces are the same as described above.

Yet another subject of the invention is a substrate comprising a metallic surface, treated according to the method for treatment of the present invention. Such substrates can for example be used as parts of motor vehicles such as automobiles, rail vehicles, aircrafts, spacecrafts, parts of apparatus and machines, furniture parts, parts used in the construction field, to produce guard railing, lamps, profiles, cover panels or small parts, autobodies and parts thereof, single or separate components, pre-assembled elements, preferably for automobiles and aircrafts, for the manufacture of apparatus and constructions, particularly for household aids, control units, testing equipment or construction elements. Most preferred substrates comprising a metallic surface, treated according to the method for treatment of the present invention are autobodies, parts of autobodies, single components and pre-assembled elements for automobiles.

The metallic surfaces treated according to the invention can be coated by further, i.e. subsequent coatings. Before the application of further coatings, the treated metallic surface is preferably rinsed to remove excessive polymer (P), excessive hydrolysable organosilane compound (S) and hydrolysis products (HS) and/or condensation products (CS) thereof, as well as unwanted ions.

The subsequent coatings can be applied wet-on-wet onto the metallic surface as treated in the method for treatment according to the invention. However, it is also possible to dry the metallic surface as treated according to the invention before applying any further coating.

Most preferably the metallic surface as treated in the method for treatment according to the present invention is subsequently coated with a cathodic electrodeposition coating composition. Preferably the cathodic electrodeposition coating composition comprises epoxy resins and/or poly(meth)acrylates and if applicable crosslinking agents such as blocked polyisocyanates and/or aminoplast resins.

Most preferably the cathodic electrodeposition coating is subsequently coated after drying and/or curing with one or more filler compositions, one or more basecoat compositions and one or more clear coat compositions in this order. Filler compositions, basecoat compositions and clear coat compositions can be applied wet-in-wet. The thus obtained multilayer coating is preferably cured thermally or thermally and with actinic radiation, such as UV light or electron beams.

In the following the invention is further described by means of working examples.

EXAMPLES i) Substrates and Pretreatment

Substrates

As substrates metal sheets (10.5×19 cm) made of cold rolled steel and hot dip galvanized steel, respectively, were used.

Cleaning

The substrates were cleaned with a mild alkaline dip cleaner (Gardoclean® S 5176; Chemetall GmbH) containing phosphate, borate and tenside. To clean the substrates a 50-Liter bath containing the cleaner in an amount of the 15 g/l is heated to 60° C. and the substrates were spray-cleaned for 3 minutes at a pH of 10.0 to 11.0. Subsequently the substrates were rinsed with tap water and deionized water.

Preparation of the Conversion Bath

Oxsilan® Additive 9936 (Chemetall GmbH; containing fluoride and hexafluorozirconic acid) and Oxsilan AL 0510 (Chemetall GmbH; containing N-(2-aminoethyl)-3-aminopropyltrimethoxysilane and bis[3-(trimethyoxysilyl)propyl]amine) were added to 50 Liter of water, in an amount that a zirconium concentration of 100 ppm (as Zr) and a silane concentration of 30 ppm (as Si) resulted. The thus obtained bath was heated to 30° C. The pH value and free fluoride content were adjusted by adding a diluted sodium hydrogencarbonate solution and diluted hydrofluoric acid (5% by weight) to a pH value of 4.8 and a free fluoride concentration of 30 to 40 mg/l.

Furthermore, copper sulfate was added in an amount to result in a copper concentration of 8 ppm (if not indicated otherwise).

The bath as described above served a reference bath, since it did not contain the polymer used in the method of the invention.

To obtain conversion bathes, i.e. acidic aqueous compositions according to the invention, which can be used according to the method of the present invention a specific amount of the polymer (IP) as used in the method according to the invention (50 ppm and 200 ppm, respectively) was added to the composition of the reference conversion bath. The polymer (IP) as used in the method according to the invention is a copolymer prepared from 90 mol-% of N,N-dimethyl (meth)acryl amide and 10 mol-% of vinylphosphonic acid; it has a number-average molecular weight Mn of 14,400 g/mol and a weight-average molecular weight Mw of 26,000 g/mol. Furthermore bathes were prepared using a non-inventive polymer (NIP) being poly(methylvinylether-alt-maleic acid) ($M_n$=80,000 g/mol). The non-inventive polymer tended to partially agglomerate in the bath.

Before contacting the metal sheets with the respective conversion bathes, the conversion bathes were aged for 12 hours, to ensure a chemical equilibrium within the bathes. The bathes as used in the method according to the present invention showed no tendency to form agglomerations of the polymer.

The conversion coating was carried out by dipping the metal sheets into the conversion bath for 120 seconds, while moderately stirring the bath. Subsequently, the conversion pretreated metal sheets were rinsed with tap water and deionized water.

The pH value was continuously adapted during and between the treatment processes by the addition of diluted nitric acid.

ii) Analysis, Subsequent Coating and Corrosion Tests

X-Ray Fluorescence Analysis

The layer weights of zirconium as shown in tables 2 and 3 were determined by X-ray fluorescence analysis.

X-ray fluorescence is an analytical technique that can be used to determine the elemental composition of solid substances. A beam of x-rays strikes the surface of the sample and a core electron is ejected from the atom that absorbed the x-ray photon. When an outer electron falls into the hole created by the ejected electron, it emits energy in form of light. This light is called fluorescence and a characteristic pattern exists for each element.

The spectrometer permits qualitative and quantitative determination of any number of elements from Na to U, from trace levels 0.01% to 100%.

Analysis of the Bathes

The composition of the bathes with respect to the metal compound (M), the silicon containing species (S), (HS) and (CS) and the further metal cations can be determined during the treatment with inductively coupled plasma optical emission spectrometry (ICP-OES) or approximately by photometry, to top-up the amounts into the desired ranges, if necessary.

Subsequent Coatings

The pretreated substrates were coated by cathodic electrodeposition dip coating using Cathoguard® 800 (BASF SE). Subsequently a filler, basecoat and clear coat were applied (Daimler Black). The layer thickness of the coating layer was determined according to DIN EN ISO 2808:2007. The layer thickness was in the range of about 90 to 110 µm.

Corrosion Testing Procedures

Two different types of corrosion stress procedures were carried out, namely
a) the VDA 621-415 procedure; and
b) the MEKO S test.

As to a):

The VDA 621-415 procedure is to judge the corrosion protection of vehicle paint using an accelerated laboratory test. It is claimed that testing according to this procedure can generate results that correlate well with those seen by driven vehicles. This test is cyclic in nature, i.e. test specimens are exposed to changing climates over time.

For the VDA 621-415 procedure the test specimens were placed in an enclosed chamber and exposed to a changing climate that was comprised of the following 3 part repeating cycle. 24.0 hours exposure to salt spray according to DIN 50 021-SS. This was followed by 96.0 hours exposure to a condensing water climate according to DIN 50 017-KFW. This was followed by 48.0 hours exposure to an ambient climate of +18 to +28C according to DIN 50 014. Ten cycle repeats were carried out.

As to b):

This test method is a static corrosion endurance test (8 weeks; climate change) from Daimler Chrysler.

After both procedures, the sub-surface migration testing according to DIN EN ISO 4628-8:2012 was carried out and the sub-surface migration was determined in mm.

After the VDA 621-415 (10 cycles) procedure a stone chip resistance test according to DIN EN ISO 20567-1:2017, method C, was carried out, too.

iii) Results and Discussion

Table 1 shows the results of the sub-surface migration test after carrying out the cyclic corrosion test according to VDA 621-415 (10 cycles) using a hot dip galvanized steel substrate. Even at a very low concentration of the polymer (50 ppm) a significantly reduced sub-surface migration was observed indicating an enhanced corrosion resistance. Almost the same result is obtained at the higher polymer concentration of 200 ppm.

The stone chip resistance test according to DIN EN ISO 20567-1:2017, method C, reveals that there is no or almost no influence of polymer (P) on the stone chip resistance, while the treatment with a bath containing the non-inventive polymer (NIP) shows a significantly lowered stone-chip resistance.

TABLE 1

VDA 621-415 (10 cycles) - Hot Dip Galvanized Steel Substrate

| Polymer 50 ppm | Sub-surface migration [mm] | Stone Chip Resistance Test |
|---|---|---|
| no polymer | 0.9 | 1.0 |
| IP | 0.6 | 1.0 |
| NIP** | 3.0 | 2.8 |

| Polymer 200 ppm | Sub-surface migration [mm] | Stone Chip Resistance Test |
|---|---|---|
| no polymer | 0.9 | 1.0 |
| IP | 0.7 | 1.3 |
| NIP** | 2.2 | 2.7 |

*copper content in the bath was 10 ppm
**Non-Inventive-Polymer = poly(methylvinylether-alt-maleic acid) ($M_n$ = 80.000; obtainable from Sigma-Aldrich)

Tables 2 and 3 show the results of the sub-surface migration test after carrying out the MEKO S test using a hot dip galvanized steel substrate (table 2) and a cold rolled steel substrate (table 3), respectively.

Even at a very low concentration of the inventively used polymer IP (50 ppm) a significantly reduced sub-surface migration was observed on hot dip galvanized steel indicating an enhanced corrosion resistance.

Almost the same results were obtained at the higher polymer concentrations of 200 ppm on hot dip galvanized steel and cold rolled steel, indicating an enhanced corrosion resistance on both substrates.

Moreover, on both substrates the zirconium layer weight deposited on the substrates surfaces was significantly increased by the presence of the inventively used polymer IP in the conversion bath. Without wanting to be bound by theory, it seems that the polymer IP facilitates the deposition of zirconium which at least partially contributes to the enhanced corrosion resistance.

TABLE 2

MEKO S Test - Hot Dip Galvanized Steel Substrate

| Polymer 50 ppm | Zr layer weight [mg/m$^2$] | Sub-surface migration [mm] |
| --- | --- | --- |
| no polymer | 86 | 5.8 |
| IP | 104 | 5.2 |
| NIP* | 73 | 5.5 |

| Polymer 200 ppm | Zr layer weight [mg/m$^2$] | Sub-surface migration [mm] |
| --- | --- | --- |
| no polymer | 86 | 5.8 |
| IP | 109 | 5.6 |
| NIP* | 63 | 5.8 |

*Non-Inventive-Polymer = poly(methylvinylether-alt-maleic acid) ($M_n$ = 80.000; obtainable from Sigma-Aldrich)

TABLE 3

MEKO S Test - Cold Rolled Steel Substrate

| Polymer 200 ppm | Zr layer weight [mg/m$^2$] | Sub-surface migration [mm] |
| --- | --- | --- |
| no polymer | 42 | 5.3 |
| IP | 45 | 4.8 |
| NIP* | 40 | 5.4 |

*Non-Inventive-Polymer = poly(methylvinylether-alt-maleic acid) ($M_n$ = 80.000; obtainable from Sigma-Aldrich)

The invention claimed is:

1. A method for treatment of a metallic surface, comprising the step of
   contacting the metallic surface with an acidic aqueous composition, the acidic aqueous composition comprising
   (a) one or more metal compounds (M) selected from the group of titanium compounds, zirconium compounds and hafnium compounds;
   (b) one or more linear polymers (P), prepared by controlled radical polymerization, containing 85 to 95 mol-% of (m1) N, N-dimethyl (meth)acryl amide, and the rest being (m2) vinylphosphonic acid in form of their polymerized monomeric units, and
   the one or more linear polymers (P) being comprised in the acidic aqueous composition in an amount of 10 to 500 ppm based on the total weight of the acidic aqueous composition; and
   one or more hydrolysable organosilane compounds (S) or their hydrolysis products (HS) and/or condensation products (CS).

2. The method according to claim 1, characterized in that the metallic surface contains or consists of one or more metals or alloys selected from the group consisting of zinc, steel, cold rolled steel, hot rolled steel, galvanized steel, hot-dip galvanized steel, aluminum, magnesium and zinc-magnesium alloys.

3. The method according to claim 2, characterized in that the acidic aqueous composition has a pH in the range of 0.5 to 5.5.

4. The method according to claim 1, characterized in that the one or more metal compounds (M) are the fluoro metallates of said metals and/or the one or more metal compounds (M) are comprised in the acidic aqueous composition in a concentration in the range of 20 to 1600 ppm.

5. The method according to claim 1, characterized in that the one or more linear polymers (P) are comprised in the acidic aqueous composition in a concentration in the range of 20 to 250 ppm.

6. The method according to claim 1, characterized in that the one or more hydrolysable organosilane compounds (S) or their hydrolysis products (HS) and/or condensation products (CS) are selected from the group consisting of organoalkoxysilanes, organosilanoles, polyorganosilanoles, organosiloxanes and polyorganosiloxanes and/or that the one or more hydrolysable organosilane compounds (S) or their hydrolysis products (HS) and/or condensation products (CS) are comprised in the acidic aqueous composition in a concentration in the range of 1 to 750 ppm.

7. The method according to claim 6, characterized in that the organosilane compounds (S) or their hydrolysis products (HS) comprise at least one of the groups selected from the group consisting of amino groups, urea groups, imido groups, imino groups and ureidos group, and the one or more condensation products (CS) of the hydrolysable silane compounds (S) comprises the same number of the before mentioned groups per condensed unit of the hydrolysable silane compound (S) or its hydrolysis product (HS).

8. The method according to claim 1, characterized in that the acidic aqueous composition further comprises (d) at least one kind of metal cation selected from the group consisting of cations of metals of the $1^{st}$ to $3^{rd}$ subgroup of the periodic table of elements, cations of metals of the $5^{th}$ to $8^{th}$ subgroup of the periodic table of the elements including lanthanides, the cations of metal in the $2^{nd}$ main group of the periodic table of the elements, lithium, bismuth and tin.

9. The method according to claim 8, characterized in that the (d) at least one kind of metal cation is selected from the group consisting of the cations of zinc, copper, cerium and molybdenum and/or (d) at least one kind of metal cation is comprised in the acidic aqueous composition in a concentration in the range of 5 to 5000 ppm.

10. The method according to claim 1, characterized in that the acidic aqueous composition further comprises e) one or more water-soluble fluorine compounds.

11. The method according to claim 10, characterized in that the one or more water-soluble fluorine compounds is a water-soluble fluoride having free fluoride ions (F") and the concentration of free fluoride in the acidic aqueous composition is in the range of 15 to 150 ppm.

12. An acidic aqueous composition as used in claim 1.

13. A master batch to produce the acidic aqueous composition according to claim 12 by diluting the master batch with water and if applicable adjusting the pH value.

14. A method of using the acidic aqueous composition according to claim 12, the method comprising using the acidic aqueous composition for treating a metallic surface.

15. The method according to claim 14, characterized in that the method provides corrosion protection to the metallic surface and/or provides an increased adhesion of further coatings applied onto the thus treated metallic surface.

16. A substrate comprising a metallic surface, treated according to the method as defined in claim 1, the substrate being selected from the group consisting of parts of motor vehicles, rail vehicles, aircrafts, spacecrafts, parts of apparatus and machines, furniture parts, parts used in the construction field, to produce guard railing, lamps, profiles, cover panels or small parts, autobodies and parts thereof, single or separate components, pre-assembled elements, for the manufacture of apparatus and constructions, for household aids, control units, testing equipment and construction elements.

* * * * *